United States Patent [19]

Arbuckle

[11] Patent Number: 4,505,115
[45] Date of Patent: Mar. 19, 1985

[54] FLUIDIC TRANSFORMER APPARATUS WITH FEEDBACK

[76] Inventor: Donald P. Arbuckle, 4483 S. Vrain, Denver, Colo. 80236

[21] Appl. No.: 299,868

[22] Filed: Sep. 8, 1981

[51] Int. Cl.³ ............................................. B60T 11/20
[52] U.S. Cl. ..................... 60/562; 60/579; 60/581; 60/593
[58] Field of Search ................. 60/579, 581, 593, 562

[56] References Cited

U.S. PATENT DOCUMENTS

| | | | |
|---|---|---|---|
| 1,707,781 | 4/1929 | Blanchard | 60/581 |
| 2,838,950 | 7/1958 | Symon | 60/579 |
| 3,389,557 | 6/1968 | Backe et al. | 60/579 |
| 3,611,517 | 10/1971 | Sberg et al. | 60/581 |
| 3,928,970 | 12/1975 | Farr | 60/562 |
| 3,972,192 | 8/1976 | Muterel | 60/562 |
| 4,117,681 | 10/1978 | Falk | 60/562 |

Primary Examiner—Robert E. Garrett
Assistant Examiner—Scott L. Moritz
Attorney, Agent, or Firm—Young & Martin

[57] ABSTRACT

An applied pressure or volume change is intrinsically transformed into an output pressure or volume change which is related to the magnitude of the relative input quantity and a ratio of effective areas of pressure application surfaces of a plurality of pistons in a fluidic transformer. The surfaces of the pistons are interconnected by fluid communication paths in a predetermined manner such that pressures existing in each of the communication paths relate only to the input pressure relative to the reference pressure and a ratio of the effective surface areas of the pistons, and such that the pistons are in a balanced force equilibrium state. The pressures present in the communication paths can be operatively applied on opposite sides of fluid sealing elements of a plurality of sealing elements arranged in serial order to operatively seal between the applied pressure and the reference pressure. Each of the individual seal elements of a seal assembly is required to withstand only an increment of the overall pressure differential. The fluidic transformer maintains the incremental pressure across each seal element, and all seal elements in the assembly effectively resist what can be a very substantial difference between the input and reference pressures.

26 Claims, 8 Drawing Figures

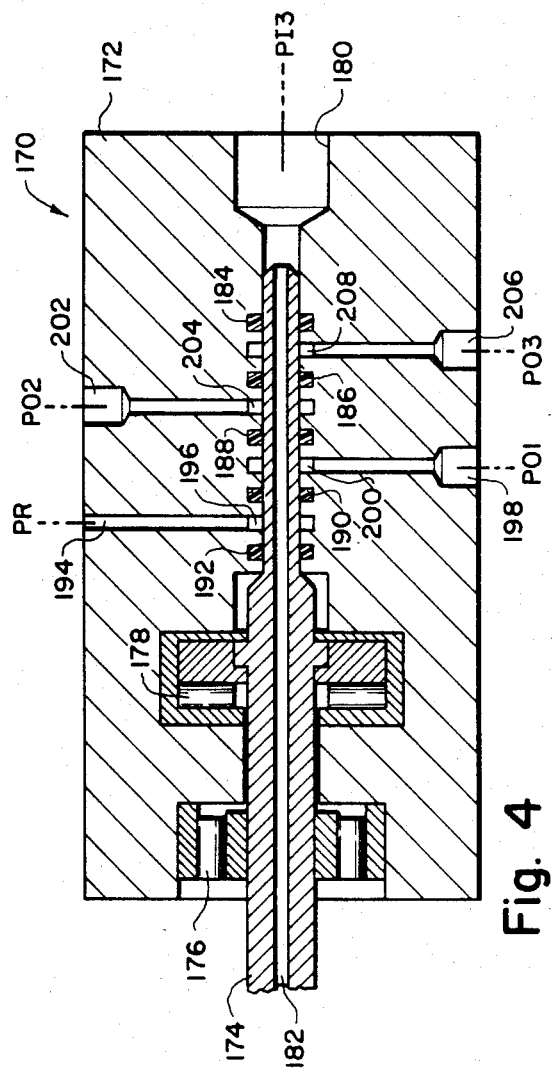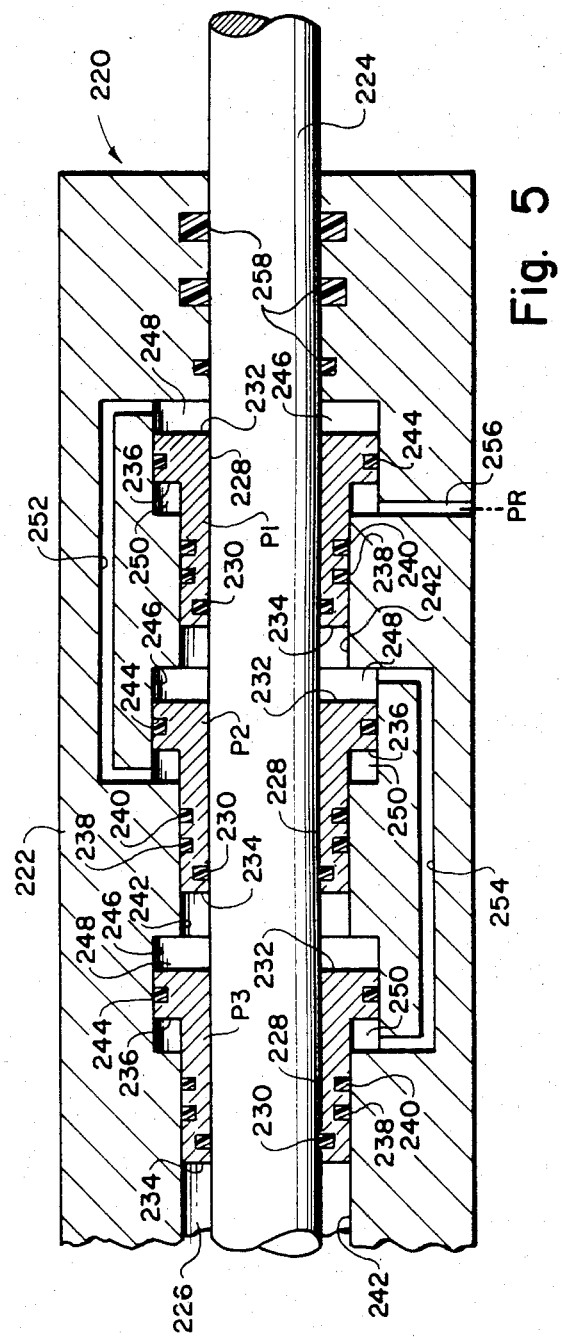

FLUIDIC TRANSFORMER APPARATUS WITH FEEDBACK

The present invention primarily relates to fluidics or hydraulics. More specifically, the present invention pertains to a new and improved method and apparatus for intrinsically transforming the magnitude of an input or applied pressure or volumetric change to at least one output or supplied pressure or volumetric change which is a predetermined multiple or fraction of the input quantity, and to creating and applying transformed pressures to fluid seal elements to maintain predetermined pressure differentials across each seal element in a series and thereby achieve higher overall pressure sealing capabilities, both on a static and dynamic operating basis.

The present invention can be used in virtually a countless number of fluid applications. One very important application is as or in conjunction with fluid seals. Rod seals, rotary (shaft) seals, piston seals and plunger seals may advantageously incorporate the present invention. The present invention can also be advantageously employed as a fluid pump or a pressure intensifier, amplifier, divider or reducer. Linear actuators, shock absorbers and static pressure regulators can also be improved by employing the present invention. The pressure present on the hulls and shells of deep ocean exploration vehicles and submarines can be better controlled and utilized for strength and safety. Phase changes in chemical elements in high pressure environments can be more readily achieved, allowing diamonds and the like to be more easily grown. The present invention will find utility in any application in which a large volume of low pressure fluid is employed to create a small volume of high pressure fluid, or in which a small volume of high pressure fluid is employed to create a large volume of low pressure fluid, or in which a low pressure fluid source is employed to create a low pressure source in one or more incremental steps. Many applications for the present invention will be apparent after obtaining complete appreciation of the invention.

BACKGROUND

In the field of fluid hydraulics, the need for pressure intensifiers and reducers is well known. One type of pressure intensifier utilizes external mechanical elements which act on the hydraulic fluid to increase its energy content and pressure. One type of pressure reducer is a pressure regulator which utilizes external mechanical control elements to absorb or control the flow rate of the hydraulic fluid in order to reduce its energy content and pressure.

Another well known type of pressure intensifier or reducer involves an assembly of pistons in hich each piston includes at least two opposing surfaces of different surface areas. By applying pressure to the smaller surface, the resulting force on the piston creates a reduced pressure at the larger surface. By applying pressure to the larger surface, an increased pressure results at the smaller surface. Piston-type intensifiers and reducers have the advantage of preserving the energy content of the fluid while inherently performing pressure amplification or reduction. Piston-type intensifiers and reducers are preferred over the other types of devices involving external control elements because of the reliability and predictability associated with inherent operation.

To obtain multiple increments of pressure reduction or intensification requires the use of multiple separate pistons serially connected together. Each piston in the series operates independently of the others, and each receives its input pressure from the preceding piston and supplies its output pressure to the following piston. Each piston in the series therefore creates its own independent influences on the overall performance of the system. Because of the serial connection and the independent influences of each, some difficulty exists in obtaining certain desired and controllable effects such as predetermined pressure increments across the seal elements used in the series.

In the field of fluid seal assemblies, which are used for sealing static or dynamically moving parts against the application of pressure differentials, there are no known reliable and economic seal elements which remain effective against the application of extremely high pressure differentials. Seal failure is directly related to the magnitude of the pressure differential which the seal must withstand. High pressure seals typically fail after a relatively short period of use because they are characteristically unable to withstand extremely high pressure differentials, particularly when relative movement between the seal element and one of the parts to be sealed is involved. Even when a plurality of seals are ganged or connected together, the majority of the pressure differential is typically withstood by only one seal of the group. No effective means is known to exist for deriving and maintaining equal or predetermined pressure intervals or divisions between each of the seals in the group whereby each seal is required to maintain only a predetermined fraction of the pressure differential to allow the whole group of seals to remain effective against extremely high pressures for a considerable period of use.

In the field of linear actuators, pumps and other types of fluid hydraulic movement devices, mechanical movement is derived or controlled from pressure application to pistons. The pistons may be of the pressure intensifier or reducer type, and a number of pistons may be connected in series to obtain multiplied or reduced amounts of mechanical movement from the last or output piston as compared to the amount of movement of the input or first piston obtained from pressure alplication. The amount of output piston movement varies in accordance with an exponential multiplier depending on the number of series connected pistons. Relatively large piston movements are obtained from relatively small input pressure changes in devices obtaining increased output piston movement as compared to input piston movements. Relatively small Piston movements are obtained from relatively large input pressure changes in devices obtaining reduced output piston movement as compared to input piston movement. While such radical variations in output movement and pressure compared to input pressure or movement may be desired in some situations, more uniform and smoother transitions between input pressure and output movement, or vice versa, are desired but have been previously unavailable in prior art series connected piston assemblies.

SUMMARY

One important objective of the present invention is to provide a fluidic transformer which is capable of supplying a plurality of increments of intensified or reduced pressures on a static or dynamic operating basis wherein each incremental pressure is operatively related to the other incremental pressures and to the input and reference pressures by previously unattainable relationships. Another objective is to provide a fluidic transformer comprising a plurality of pressure transforming piston devices operatively connected so that the operation of each piston device is dependent on the operation of every other piston device in the fluidic transformer. Another objective is to provide a highly effective, reliable and durable seal assembly for sealing stationary, rotational, axial or linear moving parts against extremely high pressure, preferably by employing only relatively low cost and conventional materials. A further objective is to provide an integrated pressure transformer and seal assembly wherein each of a plurality of seals is required to withstand a predetermined constant fraction of the applied pressure whereby the total number of seals remain effective against very high pressures and over a relatively long period of use. Still another objective is to provide a fluidic movement device wherein the extent of output movement obtained is related to input movement on a fractional basis, or other than an exponential basis, to achieve less radical and more controllable output movement effects and less differential pressures across seal elements.

In accordance with the foregoing and other objects, one aspect of the present invention is a fluidic transformer which comprises a plurality of pistons and means hydraulically interconnecting different surfaces formed on each of the pistons to transfer pressures between the interconnected surfaces of all the pistons in the plurality. Each of the pistons is preferably formed with a large surface and a pair of small surfaces. Pressure applied to the large surface derives force on the piston which is in opposition to that force derived by pressure application to each of the small surfaces. A reference pressure and an input pressure are applied to surfaces of different pistons in the plurality. The pressure differential between the input and reference pressures causes the transformer to inherently and intrinsically derive a plurality of internal pressures. Each internal pressure is communicated through interconnecting fluid communication paths to different surfaces of different pistons, and at least one fluid communication feedback path extends between each pair of pistons. Each internal pressure depends substantially only upon the magnitude of the pressure differential between the input and applied pressures and a ratio of the effective areas of surfaces of the plurality of pistons. The applied pressure relative to the reference pressure is inherently multiplied or divided by the intrinsic effects achieved.

When incorporated in a fluid seal assembly employing a plurality of seal elements, each internal pressure present in the fluid communication paths is operatively applied to one surface of a sealing element. By arranging the seal elements in serial order, and deriving a plurality of internal pressures incrementally related to the magnitude of the pressure differential against which the seal assembly is operative, each of the individual seal elements of the seal assemblies withstands only a predetermined incremental part of an overall relatively large pressure differential. Each of the seal elements therefore remains effective for a longer period of use, and the overall series of seal elements in the seal assembly more effectively withstands the applied pressure differential because the pressure is distributed over all the seals and each seal withstands only its predetermined increment of the total applied pressure differential.

When incorporated in fluidic movement devices, the movement of each piston in the series is more smoothly controlled as a result of the internal pressure communication through the fluid communication paths. Piston movements are related by fractions involving the effective surface areas of the pistons and the number of pistons in the apparatus. No exponential movement relationships result to make precise control more difficult in certain circumstances. Phase shifts and time delays are minimized in the overall operation.

The present invention is defined by the scope of the appended claims. A more complete understanding of the features of the present invention, as well as other objectives, improvements and advantages, is available from the following detailed description of preferred embodiments taken in conjunction with the drawings.

DRAWINGS

FIG. 4 is a cross sectional view of a rotary or linear seal assembly for a shaft olerative between pressure environments of great differentials, with which the fluidic transformer of the present invention can be advantageously employed.

FIG. 5 is a cross sectional view of a rotary high pressure seal assembly for a rotary or reciprocating shaft, in which the seal assembly integrally incorporates the fluidic transformer of the present invention.

DETAILED DESCRIPTION

Figure 1A:
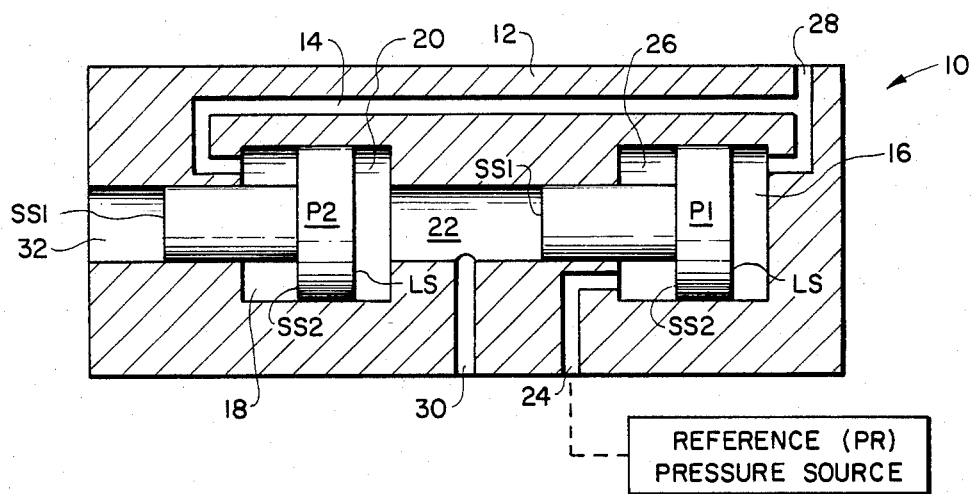
FIG. 1A is a generalized mechanical representation of the essential features of the present invention, illustrating the concepts of the nature and operation of the present invention.
Figure 1B:
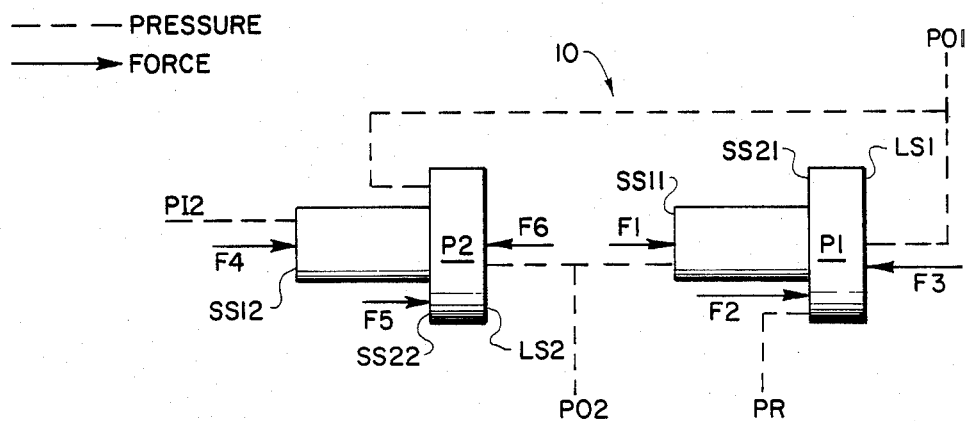
FIG. 1B is a schematic diagram illustrating the fluid pressures and forces involved in the representation shown in FIG. 1A.
Figure 2:
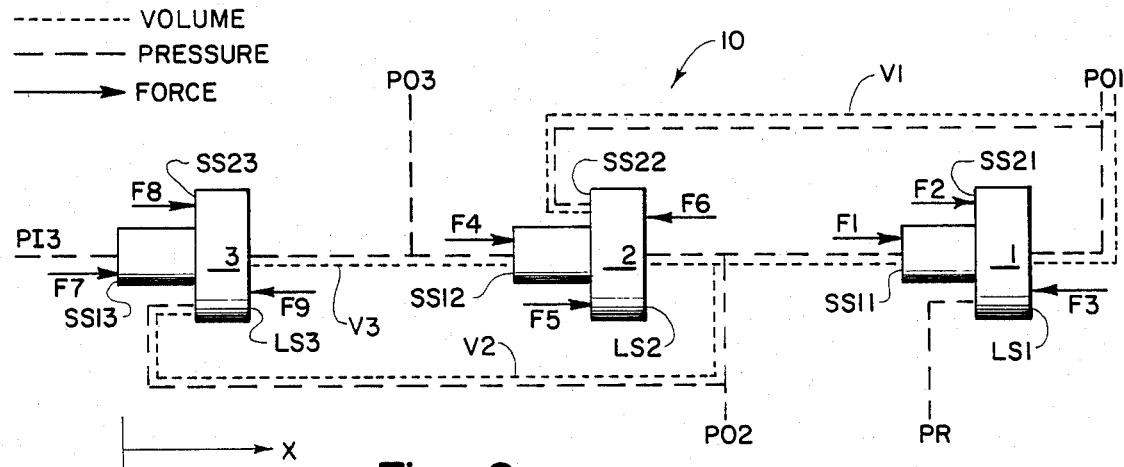
FIG. 2 is a schematic diagram similar to FIG. 1B illustrating the principles of the present invention practiced in conjunction with three pistons.

The basic features and operation of the fluidic transformer of the present invention are best described in conjunction with FIGS. 1A, 1B and 2. A few actual examples of the application of the present invention are shown and described in conjunction with a specific embodiment shown in FIG. 3, and in conjunction with various seal assemblies shown in FIGS. 5 to 7.

In its most abbreviated form, as shown in FIGS. 1A and 1B, the fluidic transformer 10 comprises a first piston P1 and a second piston P2 retained for movement within a housing 12. For descriptive purposes, each piston P1 and P2 is of annular configuration concentric about its axis. Each piston P1 and P2 defines a large end presenting a large surface LS, and a small end presenting an oppositely disposed first small surface SS1. An underside or second small surface SS2 extends from each of the pistons P1 and P2 at the location where the large end extends from the small end.

The pistons P1 and P2 are retained for movement within appropriately shaped chambers and openings formed in the housing 12. These chambers are arranged to provide fluid communication to the large surface LS, the first small surface SS1 and the second small surface SS2 of both pistons P1 and P2. A first or feedback internal fluid and pressure communication means or path 14 extends from a chamber 16 adjacent the large surface LS of the first piston P1 to a chamber 18 adjacent the second small surface SS2 of the second piston P2. A second or direct internal fluid and pressure communication means or path exists between a chamber 20 adjacent the large surface LS of piston P2 and a chamber 22 adjacent the first small surface SS1 of the first piston P1. The chambers 20 and 22 preferably directly communicate with and open into one another. A reference pressure communication port 24 extends from a chamber 26 adjacent the second small surface SS2 of the first piston P1. An output pressure supply port 28 extends through the housing 12 from the fluid communication path 14 and the chamber 16. Another output pressure supply port 30 extends from and communicates with the chambers 20 and 22. A chamber 32, which is adjacent the first small surface SS1 of the piston P2, may be open to the exterior of the housing 16 to allow force application to surface SS1 of piston P2 by an input force or pressure. The transformer 10 is capable of reversible operation, and when operation is reversed, ports 28 and 30 may receive an input quantity.

In the example of the fluidic transformer 10 shown in FIG. 1A, each of the annular pistons P1 and P2 are retained for movement in opposite directions along a common axis or reference movement path. In other embodiments, each piston could be retained for movement in its own movement reference path. The configuration of the pistons can also vary, and the reference movement path may be linear or curved, depending on the shape and construction of the piston. In the embodiment shown, the chambers 16, 18, 20, 22, 28 and 32 are of annular configuration, and fluid-tight seals (not shown in FIG. 1A but shown and described elsewhere herein) exist along the axially oriented surfaces between the chambers and the pistons P1 and P2.

The large surface LS, the first small surface SS1 and the second small surface SS2 of each piston extend at angles perpendicular to the axis of each piston. Because of the perpendicular orientation, the total area of each of the surfaces LS, SS1 and SS2 is its effective area. The effective area of each surface of the piston is that amount of the actual surface over which a hydraulic pressure acts to induce a force on the piston directly parallel to the reference movement path of the piston at the surface where the force is induced. In cases where the surface extends at angles other than perpendicular to the direction of movement of the piston at that surface, the effective area of the surface is less than the total surface area. For example, should the large surface be rounded or cone-shaped, it would present a greater actual surface area than its effective area.

One of the important considerations in the present invention is that the large surface LS associated with each piston must have an effective area greater than either one of the effective areas of the first small surface SS1 and the second small surface SS2.

Hydraulic fluid occupies the volumes of the fluid feedback path 14, the chambers 16 and 18, and the delivery port 28, the chambers 20 and 22, and the port 30. Although the hydraulic fluid may be either a gas or a fluid liquid depending on the application, a substantially incompressible liquid will be utilized in most cases. The port 24 is connected to a reference pressure source 34 which maintains a given pressure within the port 24 and chamber 26 independent of the volume of chamber 26. Force from an external mechanical means (not shown) or pressure from an external pressure source (also not shown) is applied to the first small surface SS1 of the second piston P2 through the chamber 32. Force application will result in a pressure distributed over the effective area of the first small surface SS1. Pressure application will result in a force transferred through the piston.

The schematic diagram shown in FIG. 1B illustrates the operational principle of the embodiment of the fluidic transformer shown in FIG. 1A. In FIG. 1B, pressure communication paths are shown by dashed lines, while force applications to the pistons are shown by vectors with the arrows of the vectors pointing in the direction, of the force application. The effective areas of the large surface, the first small surface and the second small surface are designated as LS, SS1 and SS2, respectively. The reference number following the designation of the surface is a reference to the particular piston presenting that surface. For example, $ASS12$ refers to the effective area of the first small surface of the second piston. PR refers to the reference pressure applied to the effective surface area $ASS21$ of surface SS21. PI2 refers to input pressure which, in FIG. 1B, is applied by whatever means over the effective area ($ASS12$) of surface SS12. A first output pressure PO1 is that internal pressure present over the effective area ($ALS1$) of surface LS1 and also over the effective area ($ASS22$) of surface SS22. A second output pressure PO2 is that internal pressure present over the effective area ($ALS2$) of surface LS2 and also over the effective area ($ASS11$) of surface SS11.

In the following anaysis, hydraulic fluid present in the chambers, communication paths and ports is sufficiently confined by means (not shown) external to the fluidic transformer such that pressure equilization ultimately occurs. The volume of fluid present in the chambers can therefore fluctuate. Furthermore, it will be seen that the fluidic transformer operates between the relative pressures of the reference pressure PR and the input pressure PI2. Since the fluidic transformer operates from relative pressure, the input pressure PI2 is assumed to be that magnitude greater or less than PR, and the reference pressure PR will therefore be zero (gauge pressure). Further, the analysis assumes operation of the pressure transformer to be frictionless.

Equilibrium conditions can be demonstrated by classical fluid equations, which will not be repeated except to the extent following. Because of equilibrium, the forces F1 and F2 applied as a result of pressures PO2 and PR at surfaces SS11 and SS21, respectively, are equal to force F3 on piston P1 resulting from pressure PO1 applied over surface LS1. The magnitude of any force derived from the application of pressure over an area is equal to the pressure multiplied by the effective area. In accordance with these concepts, equations 1 to 5 describe the situation as it applies to piston P1. Similarly, equations 6 through 10 describe the situation applicable to piston P2. Equation 5 is derived by substituting the terms of equations 2, 3 and 4 into equation 1. Equation 10 is derived by substituting the terms of equations 7, 8 and 9 into equation 6. Equation 5 can be simplified in the manner shown in equation 11 because the reference pressure PR is assumed to be zero under the above assumptions. Equation 11 can be rearranged into equations 12 and 13.

$$F1 + F2 = F3 \quad \text{(Equation 1)}$$

$$F1 = PO2 \times ASS11 \quad \text{(Equation 2)}$$

$$F2 = P_R \times ASS21 \quad \text{(Equation 3)}$$

$$F3 = PO1 \times ASL1 \quad \text{(Equation 4)}$$

$$PO2 \times ASS11 + PR \times ASS21 = PO1 \times ALS1 \quad \text{(Equation 5)}$$

$$F4 + F5 = F6 \quad \text{(Equation 6)}$$

$$F4 = PI2 \times ASS12 \quad \text{(Equation 7)}$$

$$F5 = PO1 \times ASS22 \quad \text{(Equation 8)}$$

$$F6 = PO2 \times ALS2 \quad \text{(Equation 9)}$$

$$PI2 \times ASS12 + PO1 \times ASS22 = PO2 \times ALS2 \quad \text{(Equation 10)}$$

$$PO2 \times ASS11 = PO1 \times ALS1 \quad \text{(Equation 11)}$$

$$PO2 = PO1 \times \left( \frac{ALS1}{ASS11} \right) \quad \text{(Equation 12)}$$

$$PO1 = PO2 \times \left( \frac{ASS11}{ALS1} \right) \quad \text{(Equation 13)}$$

In order to determine the first output pressure PO1, equation 10 is first rearranged as shown in equation 14. Thereafter, the value of the second output pressure PO2 shown in equation 12 is substituted into equation 14. Equation 14 is mathematically changed into equation 15, and equation 15 is solved in equation 16. Equation 16 illustrates that the first output pressure PO1 is dependent upon the input pressure PI2 and a ratio involving the effective areas of the first and second pistons.

$$PO1 \times ASS22 = PO2 \times ALS2 - PI2 \times ASS12 \quad \text{(Equation 14)}$$

$$PO1 \times ASS22 = PO1 \times \left( \frac{ALS1}{ASS11} \right)(ALS2) - PI2 \times ASS12 \quad \text{(Equation 15)}$$

$$PO1 = PI2 \left[ \frac{ASS12}{\left( \frac{ALS1}{ASS11} \right)(ALS2) - ASS22} \right] \quad \text{(Equation 16)}$$

A similar procedure is followed in deriving equations 17 and 18. Equation 18 indicates that the second output pressure PO2 is also dependent upon the input pressure PI2 and a ratio involving the effective areas of the first and second pistons.

$$PO2 \times ALS2 = PI2 \times ASS12 + PO2 \times \left( \frac{ASS11}{ALS1} \right) ASS22 \quad \text{(Equation 17)}$$

$$PO2 = PI2 \left[ \frac{ASS12}{ALS2 - \left( \frac{ASS11}{ALS1} \right)(ASS22)} \right] \quad \text{(Equation 18)}$$

The ratios or fractions defined by the surface areas enclosed within the brackets in equations 16 and 18 can be shown to always be a positive value so long as the limitation that the first and second small surfaces present effective areas, each of which is less than the magnitude of the effective area of the large surface. By selecting the effective areas of each of the surfaces of the pistons in accordance with the equations 16 and 18, incremental pressure drops or output pressures PO1 and PO2 can be achieved in accordance with predetermined ratios, depending only on the magnitude of the input pressure PI2 relative to the reference pressure and a ratio defined by the effective areas of the pistons. For example, assume that the effective areas of the first and second small surfaces of both pistons are equal to one another and are equal to an arbitrary value such as one, viz., ASS12=ASS22=ASS11=ASS12=1. Further assume that the effective areas of the large surfaces are equal to one another and to a value twice as great as the effective area of the small surfaces, viz. ALS2=ALS1=2. Inserting these values into equations 16 and 18 result respectively in equations 19 and 20.

$$PO1 = \tfrac{1}{3} PI2 \quad \text{(Equation 19)}$$

$$PO2 = \tfrac{2}{3} PI2 \quad \text{(Equation 20)}$$

With the effective areas of each of the two small surfaces of each piston being equal to one another, and the effective area of the large surface of each piston being equal to one another and to twice the value of the effective areas of the small surfaces, the fluidic transformer will provide equal pressure incremental steps separated by pressures equal to $(PI-PR) \times 1/(N+1)$, where N equals the number of pistons.

An expansion of the two-piston embodiment of the fluidic transformer is shown in FIG. 2, wherein a three-piston embodiment is illustrated schematically. It should be noted that the three-piston embodiment of FIG. 2 is simply a multiplication of the two-piston embodiment wherein the second piston P2 operates in conjunction with the first piston P1 in the manner described in conjunction with FIGS. 1A and 1B, and also operates in conjunction with a third piston P3 in a similar manner. An analysis of the three-piston fluidic transformer shown in FIG. 2 proceeds in essentially the same manner as has been outlined previously. Equations 1 through 18 apply to the transformer illustrated in FIG. 2. In addition, equations 21 to 25 below also apply and describe the force and pressure relationships applicable with respect to piston P3.

$$F7 + F8 = F9 \quad \text{(Equation 21)}$$

$$F7 = PI3 \times ASS13 \quad \text{(Equation 22)}$$

$$F8 = PO2 \times ASS23 \quad \text{(Equation 23)}$$

$$F9 = PO3 \times ALS3 \quad \text{(Equation 24)}$$

$$PI3 \times ASS13 + PO2 \times ASS23 = PO3 \times ALS3 \quad \text{(Equation 25)}$$

By comparing FIGS. 1B and 2, it is seen that the third incremental pressure PO3 shown in FIG. 2 is equal to the input pressure PI2 on the second piston as illustrated in FIG. 1B. Accordingly, equation 26 is also established. By substituting into equation 25 the values of PO2 established by equation 18 and the value of PI2 established by equation 26, equation 27 results. Manipulating equation 27 into equation 28 leads to equation 29 which indicates that the third incremental output pressure PO3 is dependent upon the input pressure PI3 and a ratio involving the effective areas of certain surfaces of all three pistons.

$$PO3 = PI2 \quad \text{(Equation 26)}$$

$$PI3 \times ASS13 + PO3 \left[ \frac{ASS12}{ALS2 - \left(\frac{ASS11}{ALS1}\right)(ASS22)} \right] ASS23 = PO3 \times ALS3 \quad \text{(Equation 27)}$$

$$PO3 \left[ ALS3 - \frac{(ASS12)(ASS23)}{ALS2 - \left(\frac{ASS11}{ALS1}\right)(ASS22)} \right] = PI3 \times ASS13 \quad \text{(Equation 28)}$$

$$PO3 = PI3 \left[ \frac{ASS13}{ALS3 - \frac{(ASS12)(ASS23)}{ALS2 - \left(\frac{ASS11}{ASL1}\right)(ASS22)}} \right] \quad \text{(Equation 29)}$$

Substitution of equations 26 and 29 into equation 18 results in equation 30. Similarly, substitution of equations 26 and 29 into equation 16 results in equation 31.

$$PO2 = PI3 \left[ \frac{ASS13}{ALS3 - \frac{(ASS12)(ASS23)}{ALS2 - \left(\frac{ASS11}{ALS1}\right)(ASS22)}} \right] \left[ \frac{ASS12}{ALS2 - \left(\frac{ASS11}{ALS1}\right)ASS22} \right] \quad \text{(Equation 30)}$$

$$PO1 = PI3 \left[ \frac{ASS13}{ALS3 - \frac{(ASS12)(ASS23)}{ALS2 - \left(\frac{ASS11}{ALS1}\right)(ASS22)}} \right] \left[ \frac{ASS12}{\left(\frac{ALS1}{ASS11}\right)(ALS2) - ASS22} \right] \quad \text{(Equation 31)}$$

It can therefore be seen that the first, second and third incremental internal and output pressures PO1, PO2 and PO3, respectively, are dependent only upon the input pressure PI3 and a ratio involving the effective surface areas of certain surfaces of all three pistons P1, P2 and P3. Assuming that the first and second small surfaces of all three pistons present the same effective areas and that each such effective area is one, and that each of the large surfaces of all three pistons present the same effective areas and that each such effective area is two, substitution of these values into equations 29, 30 and 31 result in the values set forth in equations 32, 33 and 34, respectively.

$$PO1 = \tfrac{1}{4} PI3 \quad \text{(Equation 32)}$$

$$PO2 = \tfrac{1}{2} PI3 \quad \text{(Equation 33)}$$

$$PO3 = \tfrac{3}{4} PI3 \quad \text{(Equation 34)}$$

Under the assumptions set forth for equations 32-34, the previous relationship defining the incremental pressure steps still applies: $(PI - PR) \times 1/(N+1)$, where N equals the number of pistons.

It should be noted that the principles of the above analytical approach are applicable to fluidic transformers using any number of pistons at least equal to two. For example, in four-piston embodiments, PI3 becomes equal to PO4 and a new set of equilibrium equations for the fourth piston are written and solved. In other words, analysis of a four-piston fluidic transformer builds from the analysis of the three-piston embodiment, just as analysis of the three-piston embodiment was based on the analysis of the two-piston embodiment.

It can therefore be seen that by selecting the values of the effective areas of the large and small surfaces of each piston, the incremental pressure values between the input pressure and the reference pressure can be predetermined at selected values. A staging effect results wherein the pressure differential between the input pressure and the reference pressure is multiplied or divided by increments dependent on the number of pistons and the effective areas of the pistons. The staging and incremental pressure multiplication or division holds true both in static and dynamic situations. Accordingly, the fluidic transformer of the present invention automatically multiplies or divides an input pressure into one or more output pressures related by a multiplication factor to the input pressure.

A dynamic analysis of the fluidic transformer reveals the relative movement of each of the pistons in obtaining pressure equalization, division and multiplication, and also further proves its operability from work transfer and reversable operation standpoints. An appreciation for the relative movements of the pistons is important in developing the structural and design limitations for actual operable embodiments.

The three piston transformer illustrated schematically in FIG. 2 is utilized as the basis for the dynamic analysis. Energy is applied to the transformer 10 at surface SS13 of piston P3, and energy is delivered from the transformer 10 by the hydraulic fluid occupying volume V1 at pressure PO1. The volume V1 is not confined, thereby allowing volumetric changes in the chambers and feedback communication path to occur In other words, fluid occupying volume V1 moves into and out of the transformer 10 and thereby transfers energy to and from the transformer in accordance with energy input to and removal from piston P3, respectively. Fluid is totally confined in volumes V2, wherein pressure PO2 is present, and in volume V3, wherein pressure PO3 is present. The chambers and communication paths defining volumes V2 and V3 are closed, thereby confining a constant volume of fluid in each volume. The fluid within the volumes V1, V2 and V3 is assumed to be incompressible. Therefore, there is no change in volume of V2 and V3, i.e. Delta V3=0 and Delta V2=0.

The input pressure PI3 or input force F7 is applied to surface SS13 of piston P3. The volume associated with the surface SS13 is also allowed to vary, and is thereby not confined so to allow the piston P3 to move in accordance with the input pressure or force. Upon the application of input force, piston P3 will tend to move toward the right, as shown in FIG. 2. For this reason, right-hand longitudinal movement will be regarded as movement along a reference dimension X. Movement to the right is positive movement, while movement to the left is negative movement. In each increment of movement, a change in volume is created by the area of a surface multiplied by the change in distance Delta X that that surface moves. The right-hand movement of piston P3 will tend to reduce volume V3 because of the right-hand movement of surface LS3, and will tend to increase volume V2 because of the right-hand movement of surface SS23. The same holds with respect to pistons P2 and P1. Although it is a matter of relative definition, each right-hand facing surface, LS3, LS2 and LS1, will create a negative volume effect due to the right-hand movement, while each left-hand facing surface, both small surfaces of each piston, induce positive volume effect due to the right-hand movement, as shown in FIG. 2. Changes in volumes V3 and V2 are thereby defined by equations 35 and 36 below.

*Delta V3 = −(ALS3)Delta XP3 + (ASS12)Delta XP2* (Equation 35)

*Delta V2 = (ASS23)Delta XP3 − (ALS2)Delta XP2 + (ASS11)Delta XP1* (Equation 36)

For purposes of abbreviation, each large surface is assumed to be equal in area and twice the value of each small surface, and all of the small surfaces are equal in area. Substituting the relative value of two in for each large surface and the relative value of one in for each small surface, and recognizing that the change in volumes V3 and V2 are each equal to zero since a predetermined constant amount of incompressible fluid is contained in these volumes, equations 35 and 36 are simplified into equations 37 and 38, respectively. Equation 37 is transformed into equation 39, and the equation 40 is derived by substituting equation 39 into equation 38. Equation 41 is obtained by substituting equation 39 into equation 40.

2 *Delta XP3 = Delta XP2* (Equation 37)

2 *Delta XP2 = Delta XP3 + Delta XP1* (Equation 38)

*Delta XP3 = ½Delta XP2* (Equation 39)

*Delta XP3 = ¼Delta XP1* (Equation 40)

*Delta XP2 = ⅔Delta XP1* (Equation 41)

It is apparent from the above mathematical analysis that, for the case of equal small surfaces areas and equal large surface areas wherein each large surface area presents twice the amount of surface area of each small surface, piston P1 will move three times the distance that piston P3 moves, and piston P2 will move twice the distance that piston P3 moves. In other words, under the above stated conditions, to attain dynamic pressure equalization, piston P3 will move a relative increment of one, piston P2 will move a relative increment of two, and piston P1 will move a relative increment of three.

From the understanding of the relationship of piston movement, the work transferred through the transformer 10 can be calculated, as well as any work done on the transformer itself. For purposes of abbreviated analysis, work is equal to a force applied over a given distance, i.e. work equals force times distance. The work input and the work output to the transformer 10 shown in FIG. 2 are set forth in equations 42 and 43.

*Work input = (F7)(Delta XP3)* (Equation 42)

*Work output = −(F3)(Delta XP1) + (F5)(Delta XP2)* (Equation 43)

Force equals pressure times area. Substituting the relative values for the large and small areas and the pressures present on the various surface areas, equations 42 and 43 are changed to equations 44 and 45, respectively. Substituting into equation 45, the value of PO1 relative to PI3 from equation 32, and the relative values of Delta XP1 and Delta XP2 from equations 39 and 40, and solving, results in equation 46.

*Work input = (PI3)(Delta XP3)* (Equation 44)

*Work output = PO1(2)(Delta XP1) − (PO1)(Delta XP2)* (Equation 45)

*Work output = (PI3)(Delta XP3)* (Equation 46)

By comparing equations 46 and 44, it is apparent that the work input to the fluidic transformer 10 is equal to its work output. No work is lost to the fluidic transformer, therefore proving its operability and reversability. Of course, this is only theoretical, as some losses must occur due to friction. The apparatus will not lock up but will continue to operate in accordance with the principles described above.

From the foregoing analytical description, it is apparent that more uniformly distributed pressure divisions or multiplications are available from the present invention than from previous prior art arrangements employing series connected intensifiers without pressure feedback. Furthermore, the transforming capabilities, both on a pressure and volumetric sense, of the present invention are more evenly spaced and useful for most applications. Equations 32 to 34 and equations 40 to 41 readily illustrate how the present invention, when applied in a pumping application, can transform a relatively low volume of high pressure fluid to a relatively high volume of low pressure fluid, and vice versa. It can also be shown that the pressure feedback causes the pressure and volumetric changes at each stage of the transformer to operate more simultaneously, without delay or phase-shift, thereby causing more instantaneous effects. With this analytical understanding, actual embodiments of the present invention are next described.

Three-piston Fluidic Transformer

Figure 3:
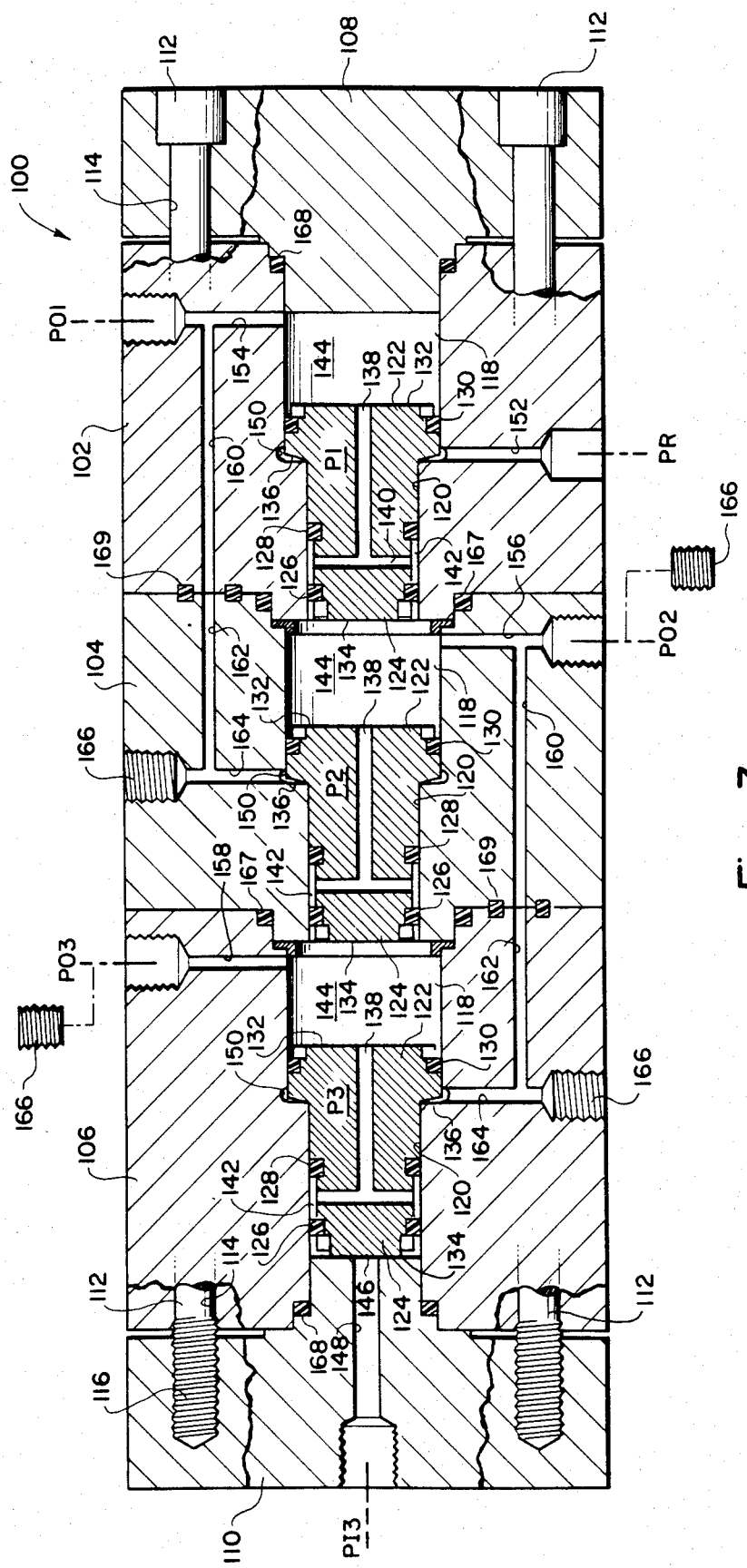
FIG. 3 is a cross sectional view of an actual embodiment of a fluidic transformer according to the present invention operating in accordance with the principles disclosed in FIGS. 1A, 1B and 2.

Actual structural features of one embodiment of a three-piston fluidic transformer 100 are illustrated in FIG. 3. The three-piston embodiment 100 is operationally equivalent to that schematically illustrated in FIG. 2.

The three-piston transformer 100 includes a housing defined by three annularly-shaped middle segments 102, 104 and 106 which are held in serial assembled order between oppositely disposed end caps 108 and 110 by a plurality of bolts 112 extending through axially extending apertures 114 formed in the end cap members and middle segments. The bolts 112 are threaded into a threaded receptacle on the end cap member 110. The apertures 114 and bolts 112 are positioned at spaced circumferential intervals not to interfere with the other elements of the fluidic transformer. A sufficient number of bolts 112 are provided to withstand the working pressures applied to the transformer 100. The middle segments 102 and 104 are of generally similar configuration, thereby allowing as many middle segments as are desired to be assembled in serial order. By this arrangement, fluidic transformers using any number of pistons are easily assembled.

Each middle segment 102, 104 and 106 is formed with an annularly-shaped large diameter opening 118 and an annularly-shaped smaller diameter opening 120. The openings 118 and 120 in each segment 102, 104 and 106 extend coaxially about the axis of the housing of the transformer 100. Pistons P1, P2 and P3 are respectively positioned for sliding movement within the openings 118 and 120 in the middle segments 102, 104 and 106, respectively. Each piston P1, P2 and P3 is formed by the threaded assembly of a large end part or member 122 and a small end connected part or member 124, not specifically illustrated. An annular piston seal 126 is carried by each piston, is positioned adjacent the outside end of the small end member 124, and seals against the small opening 120. Another annular seal 128 extends around each piston and also seals with the surface 120. The seal 128 is carried by each piston at a position between the end member 122 and seal 126. A larger annular seal 130 is carried by each piston, is positioned adjacent the outside end of the large end member 122, and seals against the large opening 118. The seals 126, 128 and 130 operatively seal each piston for movement in the openings 118 and 120.

Each piston presents a large end surface 132 at the outside surface of the large end member 122, a first small surface 134 at the outside surface of the small end member 124, and a second small surface 136 on the underside of the large piston end member 122 opposite the large surface 132. The effective areas of the surfaces 132, 134 and 136 extend essentially perpendicular to the axis of each of the pistons. Therefore, the effective area of surface 132 is the area of the annular opening 118, the effective area of the surface 134 is the area of the opening 120, and the effective area of the surface 136 is the area of the opening 120 subtracted from the area of the opening 118. The surfaces 132, 134 and 136 are designated in FIG. 2 as LS, SS1 and SS2, respectively, followed by a numerical indication associating each surface with a particular piston, i.e., 1, 2 or 3 for pistons P1, P2 or P3, respectively.

An axially extending port 138 extends through each large piston end member 122 and into each small piston end member 124. Diametrically opposed holes 140 extend from the port 138 to a reduced diameter area 142 between the seals 126 and 128 in each small piston end member 124. Hydraulic fluid at the pressure adjacent the large piston end surface 132 is communicated through the port 138 and holes 140 to the area 142 between the seals 126 and 128. The purpose of the port 138, holes 140 and area 142 is to maintain staged pressure differentials across each of the piston seals 126, 128 and 130 during operation of the transformer 100, as will be explained more fully.

Chambers for containing hydraulic fluid are formed in the pressure transformer 100 adjoining each piston surface 132, 134 and 136. Chambers 144 are located adjoining the large end surface 132 of each piston P1, P2 and P3. The chamber 144 adjacent the surface 132 of piston P1 is completed by the sealed attachment of the end cap member 108 to the middle housing segment 102, and by the surface of the large opening 118. The other chambers 144 adjoining large end surfaces 132 at pistons P2 and P3 and adjoining the small end surfaces 134 of pistons P1 and P2 are completed by the openings 118 in the housing segments 104 and 106, the end surfaces 134 of the pistons P1 and P2, and a portion of the segments 102 and 104, respectively. A chamber 146 exists adjoining the small end surface 134 of piston P3. Chamber 146 is defined by the opening 120 in housing segment 106, the end surface 134 of piston P3 sealed to the opening 120, and the attached end cap member 110. A port 148 extends through the end cap member 110 and communicates with the chamber 146. It is through the port 148 that the applied hydraulic pressure PI3 is admitted to the pressure transformer 100.

Chambers 150 are formed adjoining each piston surface 136. Although the pistons P1, P2 and P3 are shown in FIG. 3 in the left hand position wherein the volume of the chambers 152 is substantially diminished as a result of the piston surfaces 136 contacting a radially inward extending shoulder between the surfaces 118 and 120, in operation, the pistons will move to the right, as described, and achieve an equilibrium position at which the effective area of the surfaces 136 will be fully exposed to hydraulic pressure.

Pressure communication with the chambers is achieved through ports. Port 152 extends into housing segment 102 for the purpose of communicating the reference pressure PR to the chamber 150 adjacent the surface 136 on piston P1. Ports 154, 156 and 158 extend into housing segments 102, 104 and 106 for the purpose of communicating the first, second and third incremental pressures PO1, PO2 and PO3 from the chambers 144 adjoining the large surfaces 132 of the pistons P1, P2 and P3, respectively.

Feedback communication paths extend from the chambers 144 of a previous piston to the chambers 150 of each next following piston. Each feedback communication path is defined by a hole 160 formed through a middle housing segment communicating with the chamber 144, and an aligned hole 162 formed through the next following middle housing segment. A radially inward extending port 164 extends from the terminal end of each hole 162 to the chamber 150 and completes the feedback communication path between chambers 144 and 150. Plugs 166 are threaded into the exterior openings of the ports 164. The plugs 166 seal the feedback communication paths with respect to the exterior pressure environment of the pressure transformer 100 and cause the pressures to be communicated only at the ports 154, 156 and 158. Depending on the use of the transformer, ports 156 and 158 may also be sealed with plugs 166.

In order to seal the elements of the adjoining housing segments 102, 104 and 106, static annular seals 167 are retained between the housing segments 102, 104 and 106, and static annular seals 168 are retained between the end cap member 108 and segment 102 and between the end cap member 110 and segment 106. Small static annular seals 169 are retained between the middle housing segments at the junction of and surrounding the holes 160 and 162. Preferably, the seals 167, 168 and 169 are of metallic construction.

As has been previously explained, the incremental pressures PO1, PO2 and PO3 present at ports 154, 156 and 158 are related to the input pressure PI3 as defined by equations 31, 30 and 29, respectively. For the sake of simplicity, assume that the pressures PO1, PO2 and PO3 are at equal incremental steps as set forth in equations 32, 33 and 34. To achieve this pressure condition, each of the pistons move until the pressure equilibrium conditions are reached. Under such circumstances, the greatest amount of pressure differential which each seal 126, 128 and 130 is required to withstand is also only one-fourth of the total difference between the input pressure PI3 and the reference pressure PR. For example, the pressure present between seals 128 and 130 on piston P1 is the reference pressure PR admitted by port 152. The pressure present in chamber 144 adjacent surface 132 of piston P1 is one-fourth PI3. The pressure differential across each of seals 128 and 130 on piston P1 is one-fourth of the applied input pressure PI3. A similar circumstance exists for the seal 126. The pressure in chamber 144 adjacent piston P2 is one-half PI3 (equation 33). The pressure in the area 142 on the opposite side of seal 146 is one-fourth PI3. Therefore, the pressure differential across seal 126 is also only one-fourth of the applied input pressure PI3. A similar analysis for pistons P2 and P3 reveals that in each case, the seals 126, 128 and 130 are required to withstand a pressure differential of only a fractional portion of the input applied pressure relative to the reference pressure.

It is apparent that the fluidic transformer 100 divides the applied pressure PI3 (taken relative to a pressure reference PR) into incremental multiples (divisions or fractions) and supplies those incremental pressures for use. One or all of the output incremental pressures PO1, PO2 or PO3 can be utilized. If, however, certain of the incremental pressures are not needed, one or more of the ports, 154, 156 and 158, from which the pressure is applied can be closed by inserting a plug 166. In addition to supplying incremental pressures, the transformer 100 shown in FIG. 3 advantageously uses the pressure increments derived to advantageously apply pressure differentials across each of the piston seals, thereby additionally prolonging the life of each individual piston seal, since the life of a piston seal is related to the wear it experiences as a result of a pressure differential thereacross.

The pressures derived from the fluidic transformer 100 shown in FIG. 3 can be advantageously applied in conjunction with apparatus 170 illustrated in FIG. 4, as one of many examples. The apparatus 170 provides a rotating connection between a stationarily positioned housing 172 and a hollow rotary shaft 174. A rotary bearing assembly 176 rotationally mounts the shaft 174 in the housing 172 and a thrust bearing assembly 178 is also employed to support the shaft 174 against axial loads. The objective of the apparatus 170 is to communicate a high pressure PI3 applied at port 180 into a hollow interior channel 182 of the rotating shaft 174 while sealing against the escape of the high pressure to the exterior environment and pressure PR of the apparatus 170.

In order to couple the pressure effectively from the port 180 into the channel 182, a series of five seals 184, 186, 188, 180 and 190 extend in sealing contact between the housing 172 and the shaft 174. The reference or atmospheric pressure is applied to a port 194 extending to an annular chamber 196 intermediate the seals 190 and 192. Seal 192 functions basically as a lubricant seal to contain lubricant within the lubricant cavities associated with the bearings 176 and 178. A zero pressure differential exists across seal 192 because the reference or atmospheric pressure PR is applied to the lubricant in the cavities of the bearings 176 and 178. A port 198 communicates the lowest incremental pressure PO1 to an annular chamber 200 intermediate seals 188 and 190. The pressure differential across seal 190 is that part of the applied input pressure PI3 defined by equation 31. Thus, seal 190 is required to withstand only a fractional part of the input pressure for a greater lifetime and more effective seal. Similarly, incremental pressure PO2 is applied from port 202 to a chamber 204 between seals 186 and 188. Incremental pressure PO3 is applied from port 206 to a chamber 208 between seals 184 and 186. Seal 184 is thereby required to withstand and seal against the pressure differential defined by the difference between the input pressure PI3 and PO3. Seal 186 is required to withstand and seal against the pressure differential between PO3 and PO2. Seal 188 is required to withstand and seal against the pressure differential between PO2 and PO1. Seal 190 is required to withstand and seal against the pressure differential between PO1 and PR. Thus, each of the four seals 184, 186, 188 and 190 is required to withstand only an incremental portion of the overall applied pressure, and all of the seals 184, 186, 188, and 190 withstand the total high input pressure PI3.

The lifetime and effectiveness of the seals in high pressure applications is greatly enhanced. Each seal is required to withstand only a fractional amount of the overall applied pressure. Each seal is thereby more effective in preventing the transfer of pressure thereacross and remains effective for an increased lifetime. In most prior art high-pressure seals, one seal usually bears the substantial majority of the applied pressure differential. That seal usually experiences premature failure.

An example of a substantial benefit available from the present invention is its use in high pressure earth drilling equipment. It has been appreciated for a number of years that the emission of high pressure fluid jets on rock and other hard earth formation is a highly effective means of drilling. However, the effective practice of the high pressure drilling technique in actual drilling situations has been substantially impeded because no known effective technique was available for transferring the high pressure drilling fluid from the stationary high pressure pump to the rotating drill string. The present invention effectively addresses and offers a solution to this problem. The present invention is also applicable to many other types of earth drilling applications, such as blow-out preventers, among others.

The apparatus 170 shown in FIG. 4 can also be used in conjunction with shaft seals wherein the shaft 174 is fixed and it is desired to simply seal the shaft against external ambient pressure PR, or wherein the shaft is subjected to axial reciprocating movement, or wherein the shaft is subjected to both axial and rotary movement.

In order to employ the fluidic transformer 100 shown in FIG. 3 as a pump or linear actuator, ports 156 and 158 are closed with plugs 166. A constant volume of hydraulic fluid is confined in the chambers 150 and 144 associated with pistons P3 and P2, respectively, and in their feedback fluid communication paths (156, 160, 162 and 164). Similarly, a constant volume of hydraulic fluid is confined in the chamber 144 directly communicating between pistons P2 and P3 (and in the plugged port 158). Accordingly, the extent of movement at pistons P1 and P2 relative to piston P3 is shown by equations 39 through 41, under the constraints previously set forth for those equations. The port 154 remains open to deliver a high volume of relatively low pressure fluid, or a low volume of relatively high pressure fluid, or to deliver fluid for actuating a movement device, or many other applications.

Integrated Fluidic Transformer and Shaft Seal

An apparatus 220 illustrated in FIG. 5 incorporates a three-piston fluidic transformer as an integral part of a rotary or linear shaft seal. The apparatus 220 comprises a housing 222 shown as a single integrated piece for purposes of clarity, although in reality it will be formed with a number of middle segments and end cap members as has previously been described in conjunction with FIG. 3. A shaft 224 which is subject to rotary or linear or both types of motion, extends into the housing 222. A high pressure environment exists in the area 226 within the interior of the housing 222. External ambient or reference pressure PR exists on the exterior of the housing 222. The function of the apparatus 220 is to effectively seal the high pressure environment in area 226 against escape into the exterior environment PR while allowing the shaft 224 to be subject to its axial, linear or combined movement.

The apparatus 220 comprises three pistons, P1, P2 and P3. Each of the three pistons P1, P2 and P3 is formed with an annular central opening 228. A seal 230 extends between the center opening 228 and the exterior of the shaft 224, thereby sealing each piston to the shaft. Each piston presents a large end surface 232, a first small opposite end surface 234 and a second small intermediate or undercut surface 236. The surfaces 232, 234 and 236 correspond, respectively, to the surfaces 132, 134 and 136 described in FIG. 3. Each piston includes annular seals 238 and 240 for sealing the exterior surface of the piston to a smaller diameter opening 242 formed in the housing 222. Each piston further includes a large diameter annular seal 244 for sealing the larger diameter end of each piston to a large opening 246 formed in the housing 222.

Chambers 248 are defined in the housing 222 adjoining the large surfaces 232 of pistons P1, P2 and P3 and adjoining the small end surfaces 234 of pistons P1 and P2. Chambers 250 are defined by the large diameter opening 246 adjoining each of the undercut surfaces 236 of each piston. A first feedback communication path 252 extends through the housing 222 between the chamber 248 adjoining surface 232 of piston P1 and the chamber 250 adjoining the surface 236 of piston P2. A second feedback communication path 254 extends through the housing 222 between the chamber 248 adjoining the large end surface 232 of piston P2 and the chamber 250 adjoining the undercut surface 236 of piston P3. A port 256 extends to the ambient pressure or reference pressure PR from the chamber 250 adjoining the undercut surface 238 of piston P1. The pressure within the interior of the housing in area 226 is the high pressure designated PI3. It is the high pressure PI3 which is the input pressure applied to the apparatus 220 and is the pressure against which the fluidic transformer and seal apparatus 220 is operative. Seals 258 extend between the shaft 224 and the housing 222.

In accordance with the discussion previously presented in conjunction with FIGS. 2 and 3, it is apparent that the pressure in each of the chambers 228 adjoining the large end surfaces 232 of each of the pistons is an incremental fraction or multiple of the applied input pressure PI3. Each of the seals 230 is therefore required to withstand only an increment of the overall pressure differential between the applied pressure PI3 and the reference pressure PR. The seals 230 thereby form steps or pressure incremental divisions and more effectively seal the high pressure in area 226 against escape into the ambient environment. It is noted that the seals 258 are also required to withstand the lowest incremental pressure because the pressure present in chamber 248 adjoining the large end surface 232 of piston P1 is the first pressure increment closest to the reference pressure PR. The seals 258 thus benefit from the effects available from the fluidic transformer aspects of the apparatus 220.

Although not specifically illustrated in FIG. 5, ports and channels and reduced diameter portions corresponding to those designated at 138, 140 and 142 in FIG. 3 may be provided in each one of the pistons shown in FIG. 5. With such provision, the seals 238, 240 and 244 experience incremental pressure differentials similar to the effects present on seals 126, 128 and 130, respectively, described in conjunction with FIG. 3.

The integrated three-piston fluidic transformer and seal apparatus 220 illustrated in FIG. 5 intrinsically operates to provide an effective, durable arrangement for sealing a rotary shaft or a reciprocating shaft or a shaft experiencing both axial and rotary motion against high pressures.

Integrated Fluidic Transformer and Hollow Shaft Seal

Figure 6:
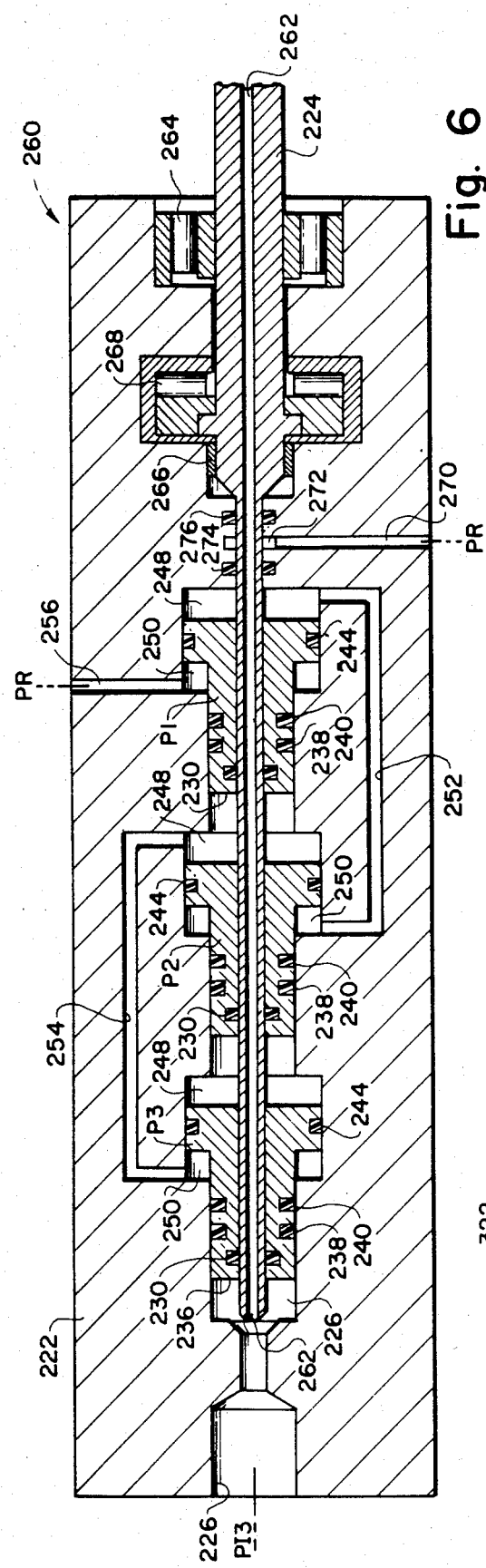
FIG. 6 is a cross sectional view of a rotary high pressure seal assembly for coupling high pressure from a stationary source to a conduit contained in a rotating element, in which the seal assembly incorporates the fluidic transformer of the present invention.

The fluidic transformer of the present invention can be advantageously integrated with an apparatus 260, shown in FIG. 6, wherein a high pressure PI3 is coupled from a stationary housing into the interior conduit of a rotating shaft, while an effective seal is maintained between a high pressure and the ambient or reference pressure. The apparatus 260 is then very similar in structure and operation to the apparatus 220 described in conjunction with FIG. 5. Because of the similarity, the elements previously described in FIG. 5 are identified by similar reference numerals in FIG. 6.

In the embodiment shown in FIG. 6, the shaft 224 has a hollow interior conduit 262 through which pressure PI3 is communicated from the port 226 in the stationary housing 222. The shaft 224 rotationally mounted in the housing 222 by a rotary bearing assembly 264, a bushing 266, and a thrust bearing assembly 268 operatively positioned in the housing 222. A port 270 extends between the reference pressure PR and a chamber 272 annularly adjacent the exterior surface of the shaft 224 between piston P1 and the bearing means 264, 266 and 268. A seal 274 is positioned axially intermediate the chamber 272 and the chamber 248 adjacent the large end surface of piston P1. The seal 274 prevents the passage of hydraulic fluid from the chamber 248 adjacent the large end of piston P1 to the ambient or reference pressure. The pressure differential across seal 274 is, of course, a fraction of the overall pressure differential PO1 between the input pressure PI3 and the reference pressure PR. A seal 276 is operative at a zero pressure differential to contain the lubricant within the lubricant cavities associated with the bearing means 264, 266 and 268.

The integrated three-piston fluidic transformer and seal apparatus 260 shown in FIG. 6 provides the substantial advantages of seal effectiveness and longevity in high pressure applications. The advantages associated with the apparatus of FIG. 6 are essentially similar to those previously described in conjunction with FIG. 5.

Integrated Fluidic Transformer and Piston Seal

Figure 7:
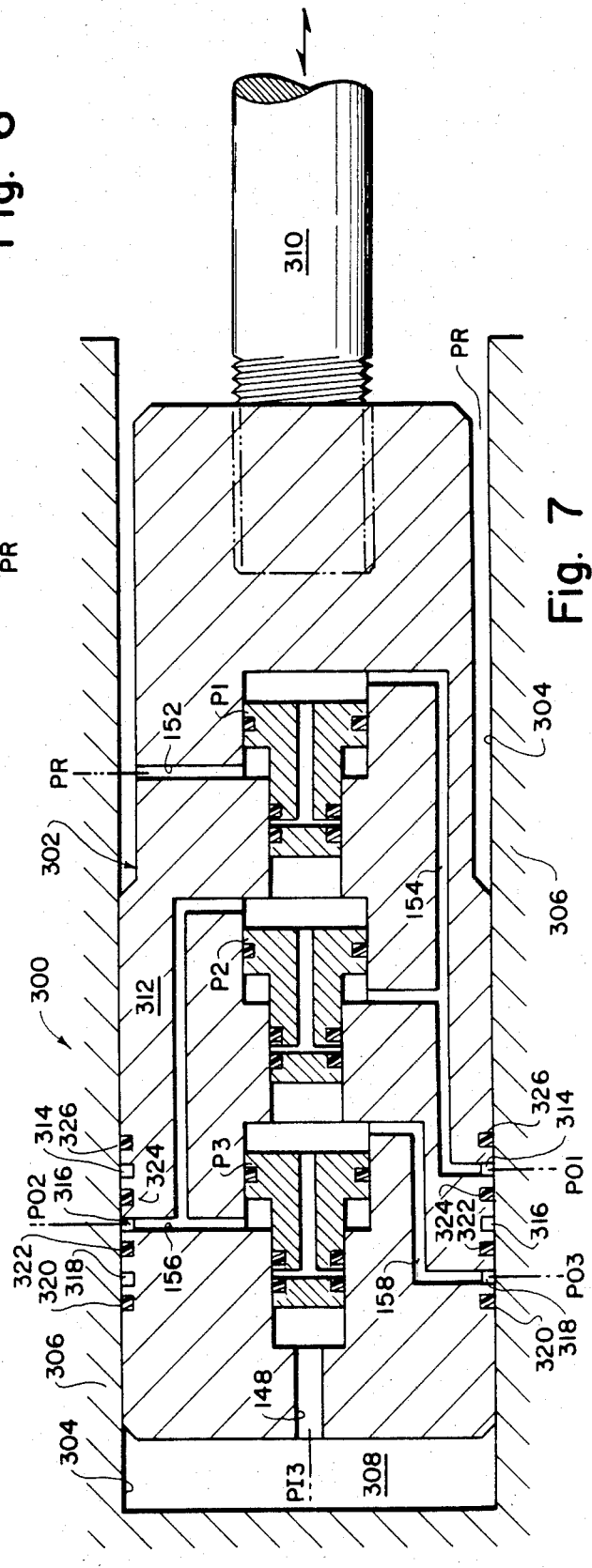
FIG. 7 is a cross sectional view of a high pressure piston seal assembly incorporating the fluidic transformer of the present invention.

An application 300 of the fluidic transformer in a dynamic pressure changing situation is illustrated in FIG. 7 wherein a compression piston assembly 302 is reciprocated longitudinally within a cylinder 304 defined by a housing 306 for the purpose of compressing a hydraulic fluid within a compression chamber 308. A connecting rod 310 is operatively connected to a piston housing 312 for the purpose of reciprocating the compression piston. The piston housing structure 312 is shown in FIG. 7 a single element but in reality is assembled from a number of housing segments and end cap members in an exemplary manner illustrated by FIG. 3. Three fluidic transformer pistons P1, P2 and P3 are operatively retained within the piston housing 312. The structure and operative features of the fluidic transformer defined by pistons P1, P2 and P3 is entirely similar to the fluidic transformer 100 described in conjunction with FIG. 3. The pressure communication ports 148, 152, 154, 156 and 158 are correspondingly labeled in FIGS. 3 and 7. Because the compression piston 302 is constantly reciprocated within the housing 302, the pressure in chamber 308 dynamically changes from one instant to the next. Accordingly, PI3 dynamically fluctuates. Of course, the reference pressure PR remains approximately constant at zero gauge pressure. Under dynamic operating conditions, the pressures PO1, PO2 and PO3 fluctuate substantially in accordance with equations 31, 30 and 29, respectively. The compressibility of the hydraulic fluid employed in the fluidic transformer, the inertia of the pistons P1, P2 and P3, and friction may slightly modify the pressures PO1, PO2 and PO3, or modify the phase relationships of the pressure magnitudes PO1, PO2 or PO3, but the overall relationship defined by equations 31, 30 and 29 holds.

In order to take advantage of the incremental pressure fractions (multiplication or division) three annular slots 314, 316 and 318 are formed into the exterior annular surface of the piston housing 312. Ports 154, 156 and 158 are connected to communicate with the annular slots 312, 314 and 316, respectively. The pressures PO1, PO2 and PO3 are therefore respectively applied in the annular slots 314, 316 and 318. A first seal 320 extends between the compression chamber 308 and the annular slot 318. The seal 320 withstands the pressure differential between PI3 and PO3 as the differential may change on a dynamic basis. Seal 322 extends between the cylinder 304 and the exterior surface of the piston housing 312 at a position intermediate the annular slots 318 and 316. Seal 322 withstands the pressure differential between PO3 and PO2, as that differential may change on a dynamic basis. Seal 324 extends between the housing cylinder 304 and the piston housing 312 at a position intermediate the annular slot 314 and 316. Seal 324 withstands the pressure differential between PO1 and PO2 on a dynamic basis. Seal 326 is positioned intermediate the annular slot 314 and the end of the piston housing 312 upon which the reference pressure PR is present. The seal 326 withstands on a dynamic basis the dynamic pressure differential between PO1 and PR.

In the assembly 300 illustrated in FIG. 7, it is apparent that the seals 320, 322, 324 and 326 can block the escape of high pressures from the compression chamber 308 more effectively over a longer period of time than a single one or group of seals over which the total pressure differential (PI3—PR) is applied. By deriving incremental pressures fractionally related to the compression pressure PI3 on a dynamic basis, each of the seals 320, 322, 324 and 326 remains effective over an increased period of time to achieve higher compression pressures.

Not shown in FIG. 7 is, however, a valving arrangement for bleeding off the very high pressures attainable in compression chamber 308. Also, although the apparatus 300 has been described primarily in conjunction with the compression of compressible fluid in chamber 308, the apparatus 300 operates entirely similarly should a vacuum be created in chamber 308 by movement of the piston 302, or should a high pressure fluid be admitted to chamber 308 to control the movement of the piston 302. The fluidic transformer of the present invention functions equally as well if the input pressure PI is less than the reference pressure PR.

The numerous advantages, improvements and features of the fluidic transformer of the present invention have been described, as well as a few particularly advantageous applications of the fluidic transformer. It should be understood, however, that the specificity of the present disclosure has been made by way of example, and that changes in details and in the derivation of new applications for the fluidic transformer may be made without departing from the scope of the invention defined by the following claims.

What is claimed is:

1. A fluidic transformer operative with respect to a reference pressure for transforming an input pressure into at least one output pressure, comprising:

means defining a plurality of pistons;

means operatively retaining each piston for reciprocative movement in a reference movement path associated with each piston;

each piston defining a large surface and two small surfaces, the two small surfaces oriented to each derive force from pressure applied thereto to each move each piston in one direction in its reference movement path, the large surface oriented to derive force from pressure applied thereto to move each piston in the opposite direction in its reference movement path, each surface presenting an effective area which is defined by that amount of the actual area of the surface which is effective during pressure application to move the piston in its reference movement path, the effective area of the large surface of each piston being greater than the effective area of either of its small surfaces;

means communicating the reference pressure to a surface of one piston;

means communicating the input pressure to a surface of another piston;

internal pressure communication means for directly communicating pressures between different surfaces of different pistons to create at least one internal pressure at at least one surface of at least one piston, the internal pressure defined substantially only by the magnitude of the input pressure relative to the reference pressure and a ratio of the effective areas of the surfaces of the pistons; and means for communicating the internal pressure as the output pressure.

2. A fluidic transformer as defined in claim 1 wherein said internal pressure communication means is operative substantially only from pressures created at the piston surfaces by forces present on said plurality of pistons as a result of the reference and input pressures communicated to said surfaces of said pistons, and said internal pressure communication means communicates the internal pressure between the large surface of each piston and the small surface of another piston.

3. A fluidic transformer operative with respect to a reference pressure for transforming an input pressure into at least one output pressure, comprising:

means defining a plurality of pistons, said plurality of pistons referenced in predetermined serial order beginning with the first referenced piston and ending with the last referenced piston;

means operatively retaining each piston for reciprocative movement in a reference movement path associated with each piston;

each piston defining a large surface and two small surfaces, the two small surfaces oriented to each derive force from pressure applied thereto to each move each piston in one direction in its reference movement path, the large surface oriented to derive force from pressure applied thereto to move each piston in the opposite direction in its reference movement path, each surface presenting an effective area which is defined by that amount of the actual area of the surface which is effective during pressure application to move each piston in its reference movement path, the effective area of the large surface of each piston being greater than the effective area of either of its small surfaces;

means communicating the reference pressure to a small surface of the first piston;

means communicating the input pressure to a small surface of the last piston;

internal pressure communication means operative substantially only from pressures created at the piston surfaces by forces present on said plurality of pistons as a result of the application of the reference and input pressures to the small surfaces of the first and last pistons respectively, for communicating an internal pressure between the large surface of a piston in the predetermined order and a small surface of a next following piston in the predetermined order, and for communicating an internal pressure between the large surface of a piston in the predetermined order and the small surface of a next preceding piston in the predetermined order; and means communicating an internal pressure as one output pressure.

4. A fluidic transformer as defined in claim 3 wherein each internal pressure is defined only by the magnitude of the input pressure relative to the reference pressure and a ratio of the effective areas of the surfaces of the pistons.

5. A fluidic transformer operative with respect to a reference pressure for transforming an input pressure into a plurality of incrementally related output pressures, comprising:

means defining a plurality of pistons, said plurality of pistons referenced in predetermined serial order beginning with the first reference piston and ending with the last reference piston;

means operatively retaining each piston for reciprocative movement in a reference movement path associated with each piston;

each piston defining a large surface and first and second small surfaces, the two small surfaces oriented to each derive force from pressure applied thereto to move each piston in one direction in its reference movement path, the large surface oriented to derive force from pressure applied thereto to move each piston in the opposite direction in its reference movement path, each surface presenting an effective area which is defined by that amount of the actual area of the surface which is effective during pressure application to move the pistons in its reference movement path, the effective area of the large surface of each piston being greater than the effective area of either of its small surfaces;

means communicating the reference pressure to a small surface of the first piston;

means communicating the input pressure to a small surface of the last piston;

internal pressure communication means operative substantially only from pressures created at the piston surfaces by forces present on said plurality of pistons as a result of the application of the reference and input pressures to the surfaces of the first and last pistons respectively, for directly communicating pressures between different surfaces of different pistons to create a plurality of internal pressures at surfaces of a plurality of pistons, each internal pressure defined substantially only by the magnitude of the input pressure relative to the reference pressure and a ratio of the effective areas of surfaces of a plurality of pistons; and means for communicating a plurality of internal pressures as the plurality of incrementally related output pressures.

6. A fluidic transformer as defined in claim 5 wherein said internal pressure communication means communicates an internal pressure between the large surface of each piston in the predetermined serial order and the small surface of each following piston in the predetermined serial order.

7. A fluidic transformer operative with respect to a reference pressure for transforming an input pressure into at least one output pressure, comprising:

means defining a plurality of pistons, said plurality of pistons referenced in predetermined serial order beginning with the first referenced piston and ending with the last referenced piston, each piston defining a large surface and a first small surface and a second small surface, each surface of each piston operative to apply a force to said each piston in response to pressure applied over the surface, each piston transferring forces applied at its surfaces throughout said each piston;

housing means for retaining each piston for movement in a reference movement path in response substantially only to forces applied at the piston surfaces, said housing means defining a chamber associated and continually pressure communicating with each surface of each retained piston;

the first and second small surfaces each oriented to derive force from pressure applied thereto to move each piston in one direction in its reference movement path, the large surface oriented to derive force from pressure applied thereto to move each piston in the opposite direction in its reference movement path;

each surface of each piston presenting an effective area which is defined by that amount of the actual area of the surface which is effective during pressure application to move the piston in its reference movement path, the effective area of the large surface of each piston being greater than the effective area of either of its small surfaces;

means defining a fluid communication path between the chamber associated with the large surface of a piston in the predetermined order and the chamber associated with the second small surface of the next following piston in the predetermined order;

means defining a fluid communication feedback path between the chamber associated with the large surface of a piston in the predetermined order and a first small surface of the next preceeding piston in the predetermined order;

means for communicating the reference pressure to the second small surface of the first piston in the predetermined order;

means for communicating the input pressure to the first small surface of the last piston in the predetermined order; and means communicating one of the pressures present in a fluid communication path as an output pressure.

8. A fluidic transformer as defined in claim 7 wherein the hydraulic fluid pressure present within each fluid communication path is of a magnitude defined only by the magnitude of the input pressure relative to the reference pressure and a ratio of the effective areas of the surfaces of the pistons.

9. A fluidic transformer as defined in claims 7 or 8 wherein each pressure present in a fluid communication path is operatively created from forces on the first and last pistons as a result of the application of the reference and input pressures communicated to the aforesaid surfaces of said first and last pistons.

10. A fluidic transformer as defined in claim 9 for operatively supplying a plurality of output pressures, wherein:

said means communcating the pressure present in a fluid communication path further communicates each pressure present at each large surface of a plurality of pistons as separate output pressures;

each of the plurality of output pressures is of different magnitude; and the pressure present over the large surface of each piston is defined substantially only by the magnitude of the input pressure relative to the reference pressure and a ratio of the effective areas of the surfaces of the pistons.

11. A fluidic transformer as defined in claim 10 wherein the pressure present in each fluid communication path is of a magnitude defined substantially only by the magnitude of the input pressure relative to the reference pressure and by the ratio $1/(N+1)$, wherein N is the number of pistons of said plurality.

12. A fluidic transformer as defined in claims 1, 2, 3 or 4 for supplying a plurality of output pressures, the number of output pressure being equal to the number of pistons, each internal pressure corresponding to one output pressure.

13. A fluidic transformer as defined in claims 1, 3, 5, 7 or 8 in combination with a seal assembly having a predetermined number of seal elements, further comprising:

means communicating an output pressure of the pressure transformer to a surface of at least one seal element of the seal assembly.

14. A fluidic transformer as defined in claims 2, 4, 5 or 7 in combination with a seal assembly having a predetermined series of seal elements operatively positioned to serially seal against a pressure differential existing between the input pressure and the reference pressure and further comprising:

means for communicating the pressure present at the large surfaces of a pair of pistons to opposite sides of a seal element in the predetermined series.

15. An invention as defined in claim 14 wherein the number of seal elements in the predetermined series is one greater than the number of operative pistons of the pressure transformer, the reference pressure is applied to one side of a first seal element in the predetermined series, the input pressure is applied to one side of the last seal element in the predetermined series, and the pressure present at each large surface of each piston is applied between adjacent sides of adjacent seal elements in the predetermined series.

16. An invention as defined in claim 15 wherein the pressure present at the large surface of the piston to which the reference pressure is applied at a small surface thereof is applied on the opposite side of the seal element to which the reference pressure is applied on the other side, the pressure present at the large surface of the piston to which the input pressure is applied at a small surface thereof is applied on the opposite side of the seal element to which the input pressure is applied on the other side; and the pressures present at the large surface of each piston in incrementally ascending orders of magnitude are applied between adjacent sides of adjacent seal elements in ascending order in the predetermined series.

17. An invention as defined in claim 16 wherein said pressure transformer is an integral part of a piston assembly, and the seal elements are operative between an exterior surface of said piston assembly and a cylinder within which said piston assembly is moveably retained.

18. An invention as defined in claim 16 further comprising:

means defining an opening formed through each said piston;

a pair of relatively moveable elements, one of said relatively moveable elements comprising said means for retaining said pistons, the other of said moveable elements extending through the opening formed in each of said pistons;

a seal element operatively extending between each piston and the moveable element extending through the opening formed in said each piston;

each of said pistons retained for movement relative to both of said moveable elements; and wherein a fluid seal is defined between the pair of relatively moveable members.

19. An invention as defined in claims 1, 3, 5 or 7 wherein each piston further comprises a plurality of piston surface sealing elements carried thereby and operative for sealing against the transference of pressure between the large and two small surfaces, a pair of surface sealing elements serially operative for sealing against the transference of pressure between the two small surfaces;

each piston further comprising means for communicating the pressure present at the large surface of each piston to an area between the pair of surface sealing elements operative for sealing against the transference of pressure between the two small surfaces.

20. A method of intrinsically transforming the magnitude of an applied pressure relative to a reference pressure into a plurality of output pressures incrementally related to the applied pressure relative to the reference pressure, comprising:

providing a plurality of pistons;

forming each piston with first, second and third surfaces;

orienting the surfaces on each piston to create forces on said each piston from the application of hydraulic pressure thereto, the forces applied to said each piston from pressure application to the second and third surfaces being additive, the force applied to said each piston from pressure application to the first surface being in opposition to those forces applied from the second and third surfaces;

fluidically interconnecting the different surfaces of different pistons to transfer pressures between the interconnected surfaces of all of the pistons in the plurality in fluid communications paths;

predetermining the areas of the surfaces of each piston which are effective upon application of pressure to create the aforesaid forces on said pistons so that the effective area of the first surface is greater than the effective area of either the second or third surfaces of said each piston;

applying the reference pressure to one of a second or third surface of one piston in said plurality;

applying the input pressure to one of a second or third surface of another piston in said plurality; and deriving a plurality of internal pressures present in the fluid communication paths substantially only from the application of the input and reference pressures to said surfaces of said pistons, each internal pressure determined only by the magnitude of the input pressure relative to the reference pressure and a ratio of the effective areas of a plurality of surfaces of a plurality of pistons.

21. A method as defined in claim 20 wherein:

the plurality of pistons is referenced in predetermined serial order from a first piston in the plurality to a last piston in the plurality;

the reference pressure is applied to one of the second or third surfaces of the first piston;

the input pressure is applied to one of the second or third surfaces of the last piston; and a communication path fluidically interconnects the first surface of one piston in the predetermined order and one of the second or third surfaces of the next following piston in the predetermined order.

22. A method as defined in claim 21 wherein a communication path fluidically interconnects a first surface of one piston in the predetermined order and one of the second or third surfaces of a next preceding piston in the predetermined series.

23. A method as defined in claim 22 wherein:

the effective area of each first surface of each piston is equal;

the effective area of each second and third surface of each piston is equal; and the effective area of each first surface is twice the magnitude of the effective area of each second or third surface.

24. A method as defined in claim 23 wherein each internal pressure is related to another internal pressure by the difference between the input and reference pressures multiplied by the factor $1/(N+1)$, where N equals the number of pistons in said plurality.

25. A method as defined in claim 24 wherein the extent of relative movement of each piston is related to the extent of relative movement of the preceding and following pistons in the predetermined series by the factor $1/N$.

26. A fluidic transformer as defined in claim 11 wherein the extent of relative movement of each piston is related to the extent of relative movement of every other piston by a factor involving the ratio $1/N$.

* * * * *

UNITED STATES PATENT AND TRADEMARK OFFICE
CERTIFICATE OF CORRECTION

PATENT NO. : 4,505,115

DATED : March 19, 1985

INVENTOR(S) : Donald P. Arbuckle

It is certified that error appears in the above-identified patent and that said Letters Patent is hereby corrected as shown below:

In column 1, line 55, delete "hich" and substitute --which--.
In column 2, line 45, delete "alplica-" and substitute --applica- --.

In column 4, line 35, Figure 4, delete "olerative" and substitute --operative--.

In column 6, line 21, delete ",".
In column 14, line 29, delete "150" and substitute --152--.
In column 15, line 65, delete "170" and substitute --100--.
In column 21, line 4, delete "thc" and substitute --the--.

Signed and Sealed this

Twenty-third Day of July 1985

[SEAL]

Attest:

DONALD J. QUIGG

Attesting Officer

Acting Commissioner of Patents and Trademarks

UNITED STATES PATENT AND TRADEMARK OFFICE
CERTIFICATE OF CORRECTION

PATENT NO. : 4,505,115
DATED : March 19, 1985
INVENTOR(S) : Donald P. Arbuckle

It is certified that error appears in the above-identified patent and that said Letters Patent is hereby corrected as shown below:

In claim 11, column 23, line 60, delete "1" (second occurrence) and substitute --1'--.

In claim 24, column 26, line 31, delete "1" (second occurrence) and substitute --1'--.

Signed and Sealed this

Twenty-third Day of July 1985

[SEAL]

Attest:

DONALD J. QUIGG

Attesting Officer

Acting Commissioner of Patents and Trademarks